Oct. 8, 1940.                A. R. COE                2,217,357
                              CLUTCH
                        Filed March 21, 1938
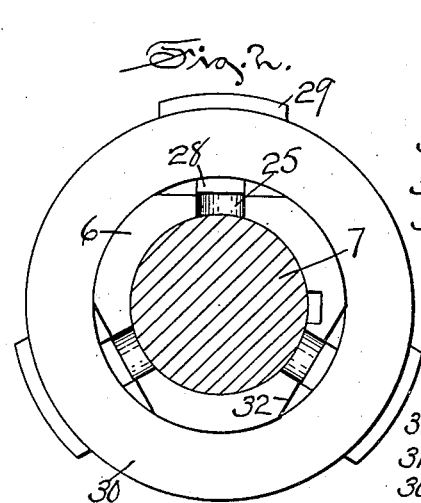
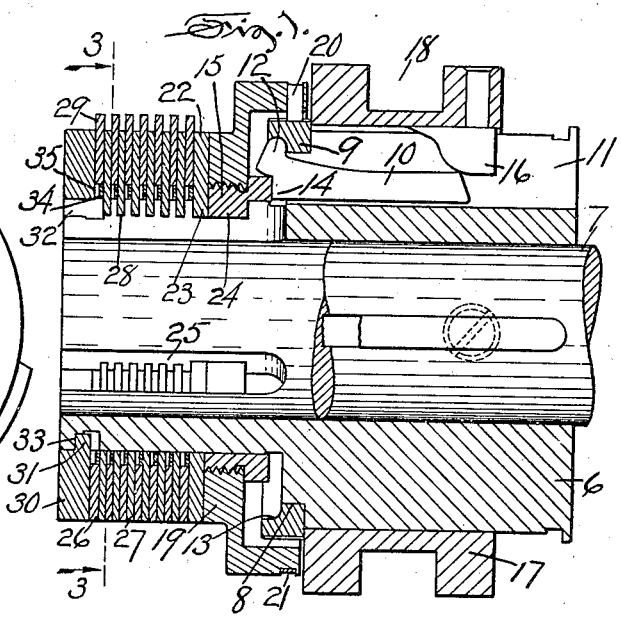
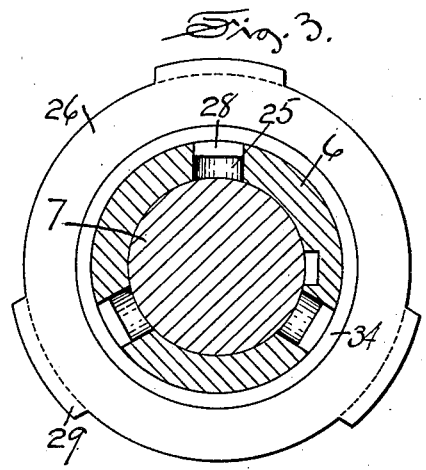
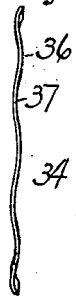
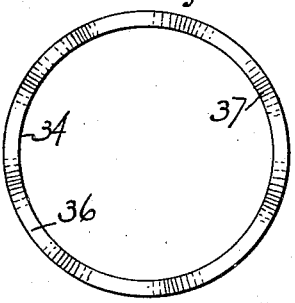
INVENTOR
Allan R. Coe
by
Arthur B. Jenkins
ATTORNEY Patented Oct. 8, 1940

2,217,357

UNITED STATES PATENT OFFICE 2,217,357

CLUTCH

Allan R. Coe, Manchester, Conn., assignor to The Carlyle Johnson Machine Co., Manchester, Conn., a corporation of Ohio Application March 21, 1938, Serial No. 197,157

2 Claims. (Cl. 192—69)

My invention relates to the class of devices which are employed for temporarily connecting two members or parts for simultaneous operation, and an object of my invention, among others, is the creation of a device of this type that shall be extremely simple in construction, as well as durable, and that shall also be particularly efficient in operation.

One form of a clutch embodying my invention and in the construction and use of which the objects herein set out, as well as others, may be attained, is illustrated in the accompanying drawing, in which—

Figure 1 is a view in central lengthwise section through a clutch embodying my invention.

Figure 2 is an end view of the same.

Fig. 3 is a view in cross section on a plane denoted by the dotted line 3—3 of Figure 1.

Figure 4 is an edge view of one of the clutch disc releasing members.

Figure 5 is a side view of the same.

In the use of disk clutches, of the type disclosed herein, there is a tendency for the disks to stick and they do not therefore readily separate when clutching pressure upon them is released, and in order to avoid this objectionable result I have devised means for effectively separating the disks when the pressure upon them is released, such means being located in spaces provided for them without increasing the bulk of the structure and without increasing its weight, these my improved releasing devices being illustrated in the drawing forming a part of this specification, in which the numeral 6 denotes a clutch body which has a hole through it to receive a driving shaft 7 to which the body is secured in any suitable manner, as by means of a key or otherwise. One end of the body is reduced in size, as shown in Figure 1 of the drawing, and a shoulder 8 is formed thereon next to this reduced part to receive a grooved seating ring 9 for clutch levers 10 extending within and along grooves 11 in the clutch body, heels 12 of said levers being seated in a groove 13 in said ring, and the toes 14 of said levers being adapted for pressure against a clutch ring 15 slidably mounted on the reduced end of the clutch body. Said seating ring is tightly secured to the clutch body and ends of the levers 10 are engaged by cams 16 on a clutch actuating sleeve 17 slidably mounted on the clutch body and having an annular groove 18 to receive antifriction rollers mounted in the branches of the forked end of a clutch actuating lever, in a manner common to clutches of this kind, said lever not being shown herein as it will be readily understood by those skilled in the art.

A pressure ring 19 is screw-threadably engaged with the clutch ring 15 for the purpose of adjustment thereon, said pressure ring having a spring pressed detent 20 extending therethrough to engage a grooved and ribbed peripheral surface on the seating ring, a spring 21 extending along the annular groove around the ring and having its end bent to form the detent, as shown in Figure 1 of the drawing.

A clutch plate 22 in the form of a ring is slidably mounted on the reduced end of the clutch body, said plate and the clutch ring 15 having lugs 23—24 respectively engaged in slots 25 in the clutch body to connect said parts for turning movement with said body. In the structure shown herein there are three of said slots and likewise there are three clutch levers with their grooves 11, although the number of these elements is not essential and may vary to suit conditions.

The pressure ring 19 is adjustably secured to the clutch ring 15 for the purpose of regulating the pressure between the clutch discs mounted on the reduced end of the clutch body in contact with each other. These discs are arranged in two sets, one set comprising discs 26 and the other set comprising discs 27, the latter having lugs 28 engaged in the slots 25 so that rotation is imparted to the discs 27 by the clutch body. The discs 26 have lugs 29 on their peripheries that engage within grooves in a driven member, not herein shown, but in a manner that will be readily understood, this driven member being in the form of a housing surrounding the clutch discs and secured to another driven member, which may be a shaft extending into the hole in the clutch body, or which may be otherwise mounted.

The discs are secured in place on the clutch body by means of a locking ring 30 having locking lips 31 adapted to pass over flats 32 on the end of the clutch body and then to be turned to engage within grooves 33 in the clutch body, as shown in Figures 1 and 2 of the drawing.

All of the parts thus far described are of old and well known construction and, except in connection with other parts now to be referred to, constitute no part of my present invention. As hereinbefore remarked the present invention contemplates means for preventing the clutch discs from sticking together, and I accomplish this purpose by means of separating rings 34 which are somewhat narrow to be received within spaces 35 between the inner edges of the discs 26 and the reduced end of the clutch body, the openings in said discs being enough larger than the clutch body to create these spaces which are separated by the inner edges of the discs 27 as shown in Figure 1 of the drawing, these spaces being in fact annular grooves within which the separating rings are located. These rings are of wave-like form having alternate humps and depressions 36 and 37, respectively, on opposite sides, the depressions on one side of each ring being formed by the humps on the opposite side, as shown in Figure 4 of the drawing. The full thickness of these rings from the plane of the humps on one side to the plane of the humps on the opposite side is sufficient to slightly more than fill the spaces 35, so that each ring exerts pressure upon the two discs 27 between which it is located. A result of this construction is that when the discs are pressed together for clutching action by operation of the levers 10 the separating rings 34 are all compressed between the discs and when the pressure on the discs ceases the rings act to separate the discs so that there will be no dragging action of one disc upon another and the clutch, therefore, promptly terminates its clutching action.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

1. A clutch comprising a clutch body having spaced-apart slots extending inwardly from one end, clutch disks supported upon said body to operatively connect said body and a driven member and composed of two sets, the disks in one set having lugs extending into said slots and being alternately spaced by the disks of the other set and being of different diameters from the disks of said other set to create shallow spaces of relatively small radial dimensions within the disks of said other set at the inner edge thereof, narrow spring rings formed from thin flat metal located in said spaces and having closely spaced wave-like formations extending continuously lengthwise around the rings and adapted to separate the disks and relieve the adjacent disks of friction during idle moments of the clutch and means for retaining said disks on said body.

2. A clutch comprising a clutch body having spaced-apart slots extending inwardly from one end, clutch disks of annular form arranged in two sets upon said body, the openings in the disks of one set being larger than the openings in the disks of the other set to create narrow spaces of relatively small radial dimensions between the inner edges of the disks of said set and said body, the disks of said other set having lugs slidable into said slots, narrow spring rings formed from thin flat metal located in said spaces and having closely associated wave-like formations and depressions extending continuously lengthwise around the rings and adapted to separate the disks and relieve the adjacent disks of friction during idle moments of the clutch and means for retaining said disks in place.

ALLAN R. COE.